May 29, 1945.　　　　P. F. SMITH　　　　2,376,886
AERIAL TESTING APPARATUS AND METHOD OF OPERATION
Filed Jan. 15, 1941　　　3 Sheets-Sheet 1
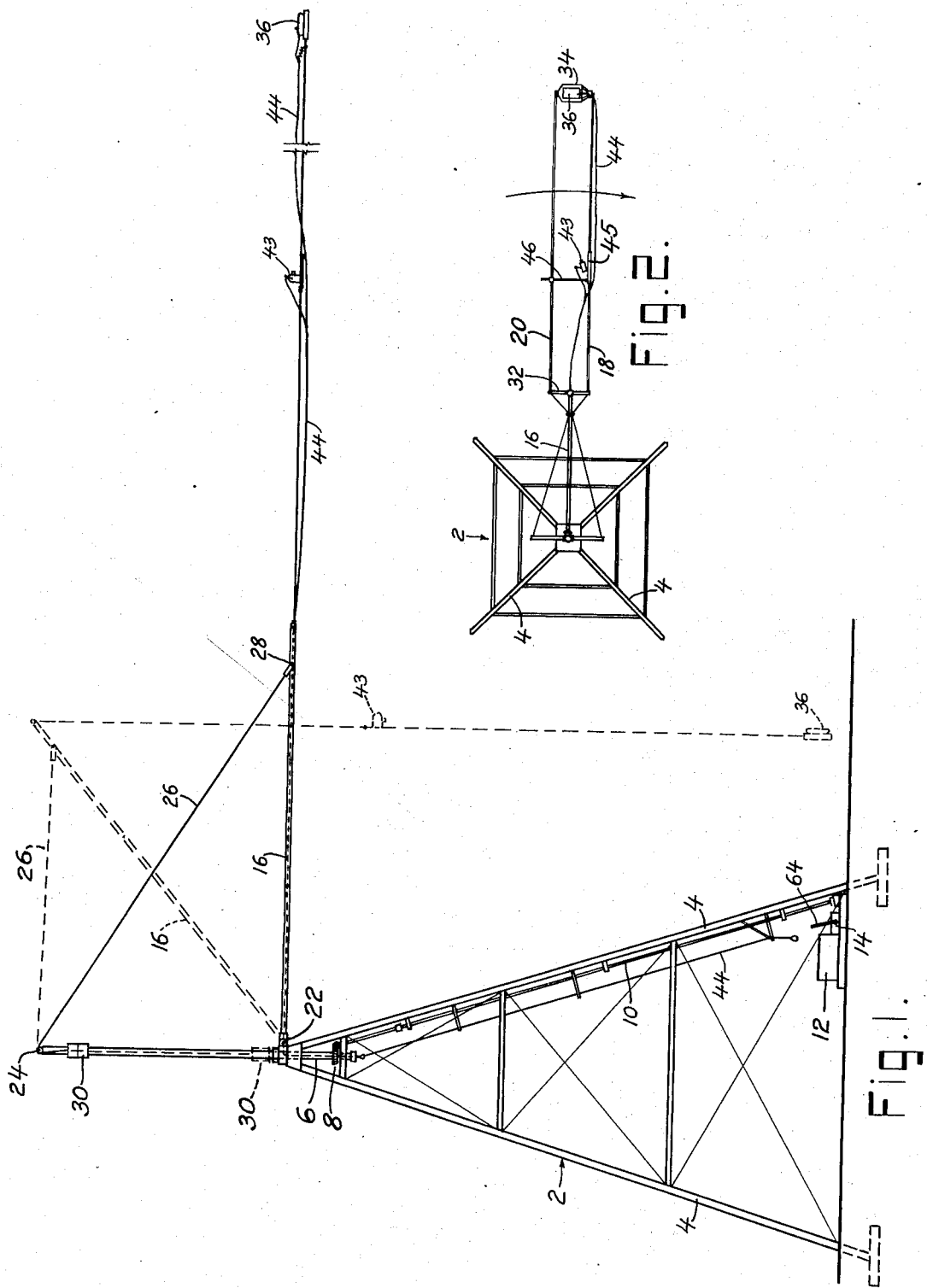
INVENTOR.
PREVOST F. SMITH.
BY
Albert Sperry
attorney May 29, 1945. P. F. SMITH 2,376,886
AERIAL TESTING APPARATUS AND METHOD OF OPERATION
Filed Jan. 15, 1941 3 Sheets-Sheet 2

INVENTOR.
PREVOST F. SMITH.
BY
Albert Sperry
Attorney

May 29, 1945. P. F. SMITH 2,376,886
AERIAL TESTING APPARATUS AND METHOD OF OPERATION
Filed Jan. 15, 1941 3 Sheets-Sheet 3

INVENTOR.
PREVOST F. SMITH.
BY
Albert Sperry.
Attorney

Patented May 29, 1945

2,376,886

UNITED STATES PATENT OFFICE 2,376,886

AERIAL TESTING APPARATUS AND METHOD OF OPERATION

Prevost F. Smith, Manchester, Conn., assignor to Pioneer Parachute Company, Inc., Manchester, Conn., a corporation of Connecticut Application January 15, 1941, Serial No. 374,462

20 Claims. (Cl. 73—432)

My invention relates to apparatus and methods for testing parachutes and other aviation equipment whereby the characteristics and operations of the equipment may be observed and studied and valuable engineering data obtained.

The ordinary wind tunnels used in testing aviation equipment are not adapted for use in testing parachutes for the reason that the rapid change in air speeds to which a parachute is subjected in use cannot be duplicated accurately in a wind tunnel. Certain other aviation equipment also require tests or should be tested by means other than those heretofore available.

In accordance with my invention parachutes and other aviation equipment may be subjected to conditions which are identical with or very accurately approach actual conditions of use and means are provided for examining and analyzing the equipment during tests so that much valuable data and information can be obtained for the improvement and comparison of aeronautical devices. While my invention is particularly valuable as an instrument for research and development purposes it is probably of more immediate practical value for performing routine testing operations such as the tests to which standard parachutes are subjected before approval by the United States Army, and Navy and by the Civilian Aviation Commission. These tests have heretofore been carried out by dropping the parachutes from an aeroplane but the aeroplane can only carry a limited number of parachutes and dummies for test purposes and therefore the testing is slow and expensive. By the use of apparatus embodying my invention such routine tests can be performed quickly and economically and in weather which is unfit for drop testing of parachutes.

The form and construction of apparatus embodying my invention and the manner of carrying out the methods thereof may vary considerably but in that form of my invention herein described and illustrated the apparatus embodies a tower provided with rotatable suspension means by which the equipment to be tested or examined is swung about in a circular path at the desired velocity and in the open air so that it will be subjected to wind velocities comparable to those which the equipment will encounter when in actual use. The speed of rotation or velocity at which the equipment is caused to travel may be varied quickly and through a wide range of speeds to duplicate actual conditions of use.

In testing parachutes with this equipment velocities approaching 400 miles per hour have been attained and yet when the parachute canopy opens the parachute itself controls the rate at which the velocity is decreased and is subjected to "shock loading" and rapid deceleration just as the opening of a parachute in use controls the rate of descent of the wearer. Photographic apparatus rotatable with the equipment is used to photograph the parachute at high speed whereby the operation of the parachute may be accurately studied. In like manner changes of velocity and centrifugal force to which other equipment are subjected may be varied to test and analyze other equipment or to gather data and information on the operations thereof under varying conditions of use.

One of the objects of my invention is to provide novel apparatus for testing and studying the operation of parachutes and other aviation equipment.

Another object of my invention is to provide novel methods for testing parachutes and the like.

A further object of my invention is to provide testing apparatus wherein the velocity of travel of the equipment to be tested may be varied rapidly and over a wide range of speeds.

Another object of my invention is to provide testing apparatus for parachutes or the like with means for examining the operation of the equipment under conditions similar to those to which the equipment is subjected in actual use.

Another object of my invention is to provide methods and means whereby equipment may be swung about in a circle of large radius whereby to simulate flight conditions and reduce the ratio of centrifugal force to wind resistance.

A specific object of my invention is to provide testing apparatus for parachutes with means for rotating a pack carrying the parachute to be tested at the desired velocity and in the open air and for photographing the operations whereby the action of the parachute on release thereof from the pack and the manner in which the pilot chute, suspension lines and canopy emerge from the pack may be observed and studied in detail.

These and other objects and features of my invention will be apparent from the following description thereof in which reference is made to the figures of the accompanying drawings.

In the drawings:

Fig. 1 is a side elevation of a typical apparatus embodying my invention,

Fig. 2 is a plan view of the apparatus illustrated in Fig. 1,

Figure 3:
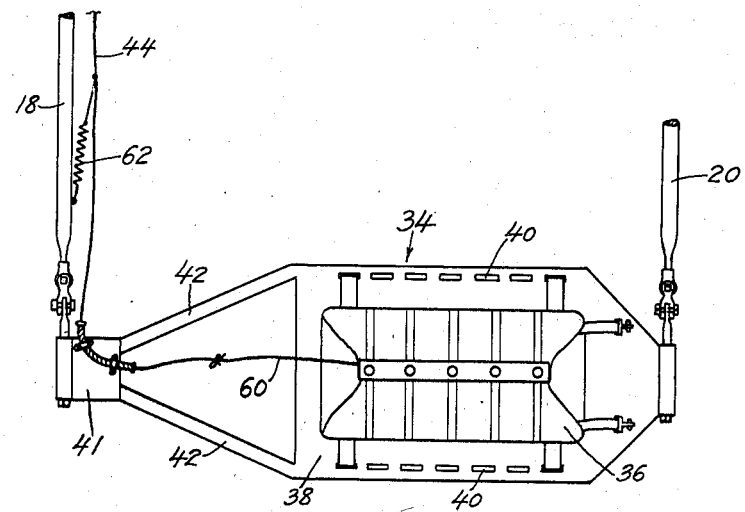
Figs. 3 and 4 are enlarged detail views of portions of the apparatus illustrated in Fig. 1.
Figure 4:
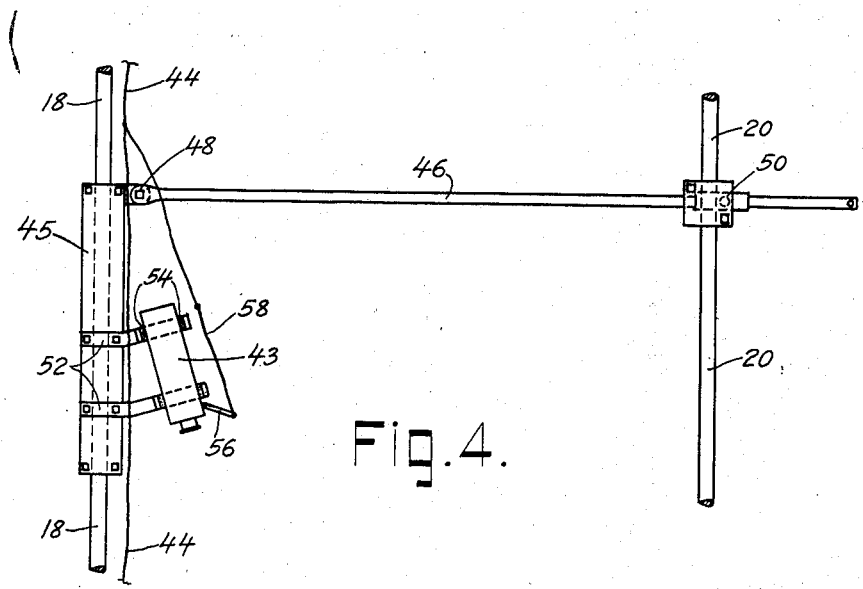

In that form of the apparatus illustrated in the figures of the drawings a tower indicated generally at 2 embodies inclined supports 4 and is provided with a vertical shaft 6 mounted for rotation in suitable bearings at the top of the tower. The shaft 6 is driven through reduction gearing 8 and the shafting 10 journalled on one of the supports 4, from an engine or other power plant 12 on the ground. The driving connections employed include a clutch 14 by which the engine may be connected to and disconnected from the shafting and other elements for rotating the vertical shaft 6.

Equipment suspension means are connected to the vertical shaft 6 for rotation therewith and as shown include an arm 16 and a pair of streamlined wires or cables 18 and 20 which extend from the end of the arm so as to be swung outward under the action of centrifugal force to cause the equipment to travel in a circular path about the tower as a center.

In order that the velocity at which the equipment travels may be relatively high it is desirable to employ equipment suspension means which are as long as possible, consistant with relatively low angular speeds and practical conditions of operation. However, if the length of the arm 16 is increased its weight also is increased and the strain placed on the tower requires heavier construction which increases the inertia of the moving parts and decreases the flexibility of operation. On the other hand, if the length of the suspension cables 18 and 20 is greater than the height of the tower the ends of the cables and the equipment attached thereto will drag along the ground during starting or stopping of a test when the shaft 6 is rotating slowly so that the suspension cables hang downward nearly vertically from the arm 16.

In order to overcome these difficulties the apparatus is provided with suitable means responsive to the action of centrifugal force to extend the equipment suspension means during tests and to decrease their effective length in response to decreasing centrifugal force. As shown in Fig. 1 the arm 16 is secured to the shaft 6 by a pivotal connection 22 which permits the arm to move up and down in a vertical plane to raise and lower the end thereof. The upper end of the vertical shaft 6 or an extension thereof, carries a pulley 24 over which passes a cable 26 having one end connected to the arm 16 at 28 and having the opposite end secured to a counter-weight 30 which normally tends to move the arm 16 to a raised position as indicated in dotted lines on Fig. 1. However on rotation of the shaft 6 and arm 16, the equipment connected to the suspension cables 18 and 20 swings outward under the action of centrifugal force, pulling on the arm 16 outward and downward and raising the counter-weight 30 to the full line position of Fig. 1, near the top of the vertical shaft 6. When the test is completed or the centrifugal force decreased for any reason, the counter-weight 30 descends and arm 16 is moved to its raised position. In this way the effective length or radius of the suspension means is increased considerably during tests and in response to the action of centrifugal force and yet is decreased when the shaft and equipment are rotated slowly at the beginning and end of a test. The equipment therefore is kept from dragging over the ground at any time.

The streamlined cables 18 and 20 are secured to the opposite ends of a horizontally extending cross arm 32 located adjacent the end of the arm 16. The outer ends of the cables 18 and 20 are connected to an equipment supporting device 34 (Fig. 3) by which the parachute pack 36 or other equipment to be tested may be secured in place. The equipment support may be of any suitable type but when testing parachutes it is designed to correspond generally in weight and characteristics to the usual dummy employed in testing parachutes. The arm 16 and cables 18 and 20 are constructed of relatively lightweight but strong materials and therefore the inertia of these parts is comparatively small so that on disengaging the clutch of the engine the parachute travels freely and the speed of movement of the dummy or equipment support are controlled by the parachute and their operation is not materially affected by the apparatus. In this way conditions are presented which are substantially identical with those encountered when an aviator carrying a parachute leaps from an aeroplane and is traveling at the same velocity.

The equipment supporting device 34 shown in Fig. 3 embodies a plate 38 provided with a series of openings 40 by means of which the parachute pack 36 may be attached to the equipment support in any of various positions to determine the influence of the air stream upon opening and operation of the parachute and pack under any conditions of use. The plate 38 preferably is tapered or formed with rods 42 which extend toward a weighted end member 41 secured to the leading cable 18 while the rear portion of the support is relatively wide and flat and is connected to the rear cable 20. The rear of the plate thus serves as a tail or fin to hold the parachute pack in a substantially horizontal position and parallel to the direction of flow of air over the parachute pack.

In order to release the parachute or operate the equipment being tested a control line 44 extends from the equipment support 34 along the rear edge of cable 18 and thence passes along the arm 16 and through an opening in the center of the vertical shaft 6. The line 44 then extends downward to a point near the motor 12 by which the apparatus is driven so that the operator may control the operation of the equipment and the engine as desired.

In order to obtain the desired data and information on the operation of the equipment an indicating or recording device is moved with the equipment or suspension means. As shown in Fig. 2 a motion picture camera 43, is mounted on a support 45 secured to the cable 18 near a cross bar 46 which extends from the cable 18 to the cable 20. The camera is focused on the equipment supporting plate 34 and the area directly in the rear thereof so as to take the desired pictures of the equipment in operation. One end of the cross bar 46 is connected to the leading cable 18 by a pivotal mounting 48 while the opposite end of the bar slidably engages a connection 50 on the rear cable 20. The mounting for the camera preferably includes elements such as the clamps 52 which are provided with sponge rubber cushioning means 54 to dampen vibrations and secure clear accurate pictures. This method of mounting the camera permits relative movement of the cables 18 and 20 and yet holds the camera in focus on the equipment even when the cables and equipment lag behind the arm 16 as usually happens when the parachute first opens.

The camera is set in operation by suitable means and preferably is actuated by the control line 44 which is used to actuate the equipment. For this purpose the camera is provided with an operating lever 56 connected to the control line 44 by an elastic member 58. The end of the control line 44 adjacent the equipment support 34 is connected to a rip cord 60 on the parachute pack or to other means for controlling operation of the equipment to be tested. A spring 62 attached to the control line 44 and the equipment support 34 normally urges the control line to an inactive position so that the camera is held inactive and the rip cord holds the parachute pack closed. The operation of the camera and release of the parachute are initiated when the control line is pulled by the operator standing on the ground near the engine 12. The connection of the elastic member 58 to the control line 44 preferably is such that the initial movement of the control line serves to set the camera in operation and thereafter further movement of the control line causes the rip cord to be pulled from its fastenings to release the flaps of the parachute pack and permit the parachute to open. In this way opening of the parachute pack and the manner in which the pilot chute and parachute canopy emerge from the pack and unfold can be photographed accurately while the parachute and equipment support are traveling at a high rate of speed.

The type of camera or indicating and recording means used will vary with the installation and type of tests being made but when observing the operation of parachutes for research purposes a high speed moving picture camera has been employed. When the pictures thus taken are projected on a screen the parachute is kept continually in focus while the background moves and the opening of the pack and parachute can be observed to take place slowly and as a gradual unfolding of the pack and parachute. The characteristics and action of the pack flaps, pilot chute and main parachute canopy as well as the manner in which the suspension lines of the parachute are drawn from the pack can then be observed and timed and comparison can be made between various structures to analyze and improve the parachutes and overcome defects incident to the use of parachutes, such as those encountered in leaping from aeroplanes traveling at very high speeds.

The type of engine and driving connection which is used may be varied considerably but in testing parachute packs it is particularly desirable to employ a clutch between the engine and driving connections so that the engine may be disconnected from the drive shaft as the parachute is released from the pack. Such a clutch is indicated generally at 14 and actuated by a lever 64.

In operating the apparatus and prior to starting a test or making an observation of a parachute, the arm 16 is raised by the counter-weight 30 and the equipment supporting plate 34 hangs at a point near the ground and adjacent the tower for ready attachment of the parachute pack thereto in the desired position. After the parachute has been secured to the plate, the clutch 14 is engaged slowly by means of lever 64 so that the shaft 6 and arm 16 begin to rotate carrying the suspension cables 18 and 20 and the equipment therewith. As the speed of rotation is increased the plate 34 and parachute pack begin to swing outward under the action of centrifugal force and pull on the arm 16 causing it to swing down and outward extending the equipment suspending cables and raising the counter-weight 30. The speed of the engine and gearing is controlled until the parachute pack has obtained the desired velocity as indicated by a tachometer on the engine which may be graduated in miles per hour. The suspension cables then extend outward nearly horizontally since the wind resistance tending to cause the parachute pack to lag behind the arm 16 is much less than the centrifugal force acting radially on the parachute pack and cables. When a stable condition has been reached and the parachute pack is traveling at the desired rate of speed the control line 44 is pulled by the operator setting the camera in operation and then immediately thereafter pulling the rip cord from its fastenings to release the parachute from the pack. At the same time, the operator releases the clutch 14 on the engine so that the apparatus will coast and is free for control by the parachute. The speed of rotation or velocity of the parachute pack and dummy are thereafter determined by the action of the parachute itself just as the speed of descent or velocity of the user of a parachute is controlled by the action of the parachute in use. After the canopy has opened the parachute quickly reduces the velocity of the equipment and the parachute and the plate 34 which serves as a dummy then swing downward and inward as the speed of rotation decreases. The counter-weight 30 then raises the arm 16 and decreases the effective length of the suspension means preventing the dummy and the parachute from dragging over the ground. After the parachute has fully opened the operator releases the control line 44 and the spring 62 attached thereto retracts so that the operation of the camera is stopped to avoid unnecessary waste of film.

When the device is used for the testing of other types of aviation equipment the manner of operation of the apparatus may be varied to suit the particular conditions to which the equipment is to be subjected in reproducing actual operating conditions. Moreover in routine testing of parachutes to determine operation thereof under standard conditions it is not necessary to employ a camera or other indicating means since the operation can be observed satisfactorily from the ground.

In some instances it may be desirable or necessary to conduct tests in which the effect of centrifugal force is entirely eliminated or to release the equipment being tested from the suspension means at very high speeds or to study super-sonic conditions. In such cases the equipment may be manually or automatically released from the equipment suspension cables and support so that it will travel on at a tangent from the testing apparatus.

Figure 5:
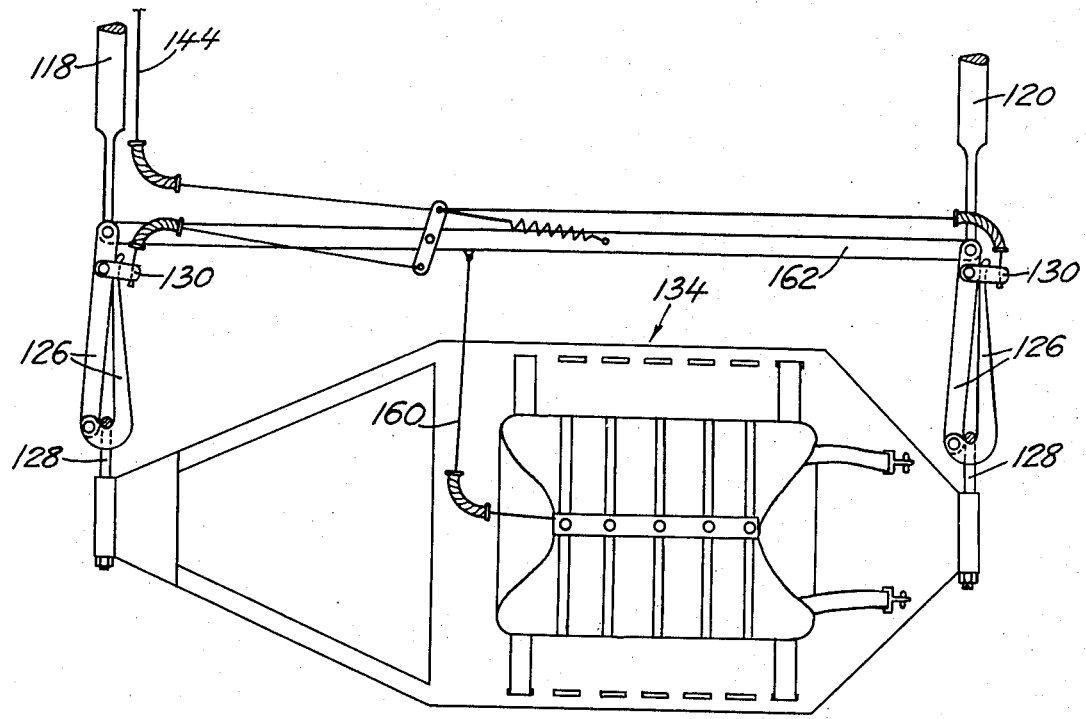
Fig. 5 illustrates an alternative type of equipment releasing means.

One such construction designed to release a parachute from the equipment support is shown in Fig. 5 wherein the support 134 is connected to the suspension cables 118 and 120 by means of pivoted hooks 126 which are releasably held in engagement with links 128 on the equipment support by the retaining rings 130. The rip cord 160 is fixedly secured to a connecting rod 162 which extends between the suspension cables 118 and 120.

Actuating means such as the manually operable control cord 144 are connected to the retaining rings 130 to retract the rings from the ends of the pivoted hooks 126 and allow the hooks to open so that the dummy and parachute carrying support 134 may fly off into space at a tangent to the path in which they are rotated. As the support 134 moves away from the connecting rod 162 the rip cord 160 is pulled to release the parachute from the pack so that the pack is not opened or the parachute released until after the effects of centrifugal force have been largely overcome or eliminated.

These and other changes in the construction and operation of apparatus embodying my invention may be made to utilize the same in performing other tests and in analyzing other types of equipment. It should therefore be understood that the form of the apparatus and the method of using the same which have been shown and described herein are intended only to be illustrative thereof and are not intended to limit the scope of my invention.

I claim:

1. Apparatus for testing aviation equipment comprising a vertical shaft mounted for rotation, a power plant for rotating said shaft, equipment suspension means rotatable by said shaft and free to swing outward from the shaft under the action of centrifugal force when said shaft is rotated, and means movable with said suspension means for recording operation of the equipment being tested.

2. Apparatus for testing aviation equipment comprising a vertical shaft mounted for rotation, a power plant for rotating said shaft, equipment suspension means rotatable by said shaft and free to swing outward from the shaft under the action of centrifugal force when said shaft is rotated, and a motion picture camera carried by said equipment suspension means and focused on said equipment for photographing the equipment being tested while being rotated by said shaft.

3. Testing apparatus for aviation equipment and the like comprising a tower having a vertically extending shaft rotatably mounted thereon near the top thereof, a power plant for rotating said shaft, equipment suspension cables connected to said shaft and rotatable thereby, means carried by the suspension cables and spaced from said shaft for supporting the equipment to be tested whereby said equipment will be freely movable outward under the action of centrifugal force so as to have a circular flight during operation, and means carried by the suspension cables for photographing the equipment while in flight.

4. Testing apparatus for aviation equipment and the like comprising a tower having a vertically extending shaft rotatably mounted thereon near the top thereof, a power plant for rotating said shaft, equipment suspension cables connected to said shaft and rotatable thereby, means carried by the suspension cables and spaced from said shaft for supporting the equipment to be tested whereby said equipment will be freely movable outward under the action of centrifugal force so as to have a circular flight during operation, extensible means engaging said suspension cables and responsive to movement of said cables under the action of centrifugal force for extending the cables during flight, and yieldable means opposing movement of said extensible means to extend the cables.

5. Testing apparatus for aviation equipment and the like comprising a tower having a vertically extending shaft rotatably mounted thereon near the top thereof, a power plant for rotating said shaft, equipment suspension cables connected to said shaft and rotatable thereby, means carried by the suspension cables and spaced from said shaft for supporting the equipment to be tested whereby said equipment will be freely movable outward under the action of centrifugal force so as to have a circular flight during operation, and vertically movable means connected to the suspension cables and opposing the action of centrifugal force for raising the suspension cables when the action of centrifugal force on the cables and equipment is decreased.

6. Apparatus for testing aviation equipment comprising a supporting structure having a vertically extending shaft rotatably mounted thereon, means for rotating said shaft, an arm rotatable by said shaft and mounted for pivotal movement in a vertical plane, means yieldably urging said arm to a raised position and equipment suspension means connected to said arm and extending from the end thereof whereby on rotation of said shaft and arm the equipment suspension means move outward under the action of centrifugal force tending to move said arm outward therewith against the action of said yieldable means.

7. Apparatus for testing aviation equipment comprising a tower, a shaft mounted near the top of said tower and rotatable about a vertical axis, means for rotating said shaft, an arm rotatable with said shaft, a pivotal connection between said shaft and arm permitting movement of said arm in a vertical plane, means yieldably urging said arm upward toward a raised position and equipment suspension means connected to said arm near the end thereof and extending to a point near the ground, said equipment suspension means being movable outward under the action of centrifugal force on rotation of said shaft and arm to swing said arm outward about said pivot and against the action of said yieldable means whereby the effective radius of said suspension means is caused to exceed the height of said tower.

8. Apparatus for testing parachutes comprising a tower having a vertical shaft rotatably mounted near the top thereof, a power plant, driving connections between the power plant and shaft, parachute pack suspension means rotatable with said shaft and adapted to swing outward from said shaft to cause a parachute containing pack carried thereby to travel in a circular path about said tower, means for releasing said parachute, and means for disconnecting said power plant from said driving connection to permit movement of the suspension means to be controlled by the action of the parachute released from said pack.

9. Apparatus for testing parachutes comprising a tower having a vertical shaft rotatably mounted near the top thereof, a power plant, driving connections between the power plant and shaft, a support for a parachute pack serving as a dummy, suspension means to which said support is secured, said suspension means being rotatable with said shaft and adapted to swing outward from said shaft to cause said support and a parachute containing pack carried thereby to travel in a circular path about said tower, means for releasing said parachute, and a clutch for connecting and disconnecting said power plant and driving connections to permit movement of said support to be controlled by the action of a parachute released from said pack.

10. A method of testing aviation equipment which comprises the steps of securing the equipment to be tested to suspension means, suspending the equipment from a support, rotating the support to cause the equipment to travel at a predetermined speed to simulate conditions of flight, independently controlling operation of the equipment and the speed of its travel while in motion and observing said operation to determine the characteristics of the equipment under the test conditions.

11. A method of testing aviation equipment which comprises the steps of securing the equipment to be tested to suspension means, rotating the suspension means and equipment at a predetermined speed to simulate conditions of flight, controlling operation of the equipment while in motion, rotating a camera with the suspension means so as to maintain the equipment in focus during flight and photographing the equipment under the test conditions.

12. A method of testing a parachute which comprises the steps of attaching a pack containing the parachute to be tested to suspension means, connecting the suspension means to a power plant actuating the power plant to cause the pack to travel at a speed comparable to those encountered in the actual use of a parachute and pack, disconnecting the power plant from the suspension means so that the pack and suspension means travel freely, and releasing the parachute from the pack whereby subsequent movement of the pack and suspension means is controlled by the action of the parachute and independently of the power plant.

13. A method of testing a parachute which comprises the steps of attaching a pack containing the parachute to be tested to flexible suspension means connected to a rotatable vertical shaft, connecting the shaft and suspension means to a power plant to cause the pack to rotate about the shaft and travel in a circular path and in a horizontal plane at a speed comparable to those encountered in the actual use of a parachute and pack, disconnecting the shaft from the power plant and releasing the parachute from the pack whereby subsequent movement of the pack and suspension means is controlled by the parachute and independently of the power plant.

14. A method of testing and analyzing the operation of a parachute which comprises the steps of swinging a pack containing a parachute about a support in a circular path, and at a speed comparable with those to which the pack and parachute are subjected during actual use thereof, moving a camera about the support so as to keep the pack within the field of the camera, releasing the parachute from the pack and operating the camera during release of the parachute.

15. A method of testing and analyzing the operation of a parachute which comprises the steps of swinging a pack containing a parachute about a support in a circular path, and at a speed comparable with those to which the pack and parachute are subjected during actual use thereof, moving a motion picture camera about the support so as to keep the pack within the field of the camera, and successively actuating the camera, releasing the parachute from the pack and terminating operation of the camera whereby the opening of the pack and unfolding of the parachute are photographed for study.

16. Apparatus for testing aviation equipment and the like comprising a tower having a vertically extending shaft mounted near the top thereof, a power plant for rotating said shaft, equipment suspension means connected to said shaft and rotatable thereby, means engaging said suspension means and responsive to the action of centrifugal force for extending the suspension means, and means by which equipment being tested may be disconnected from the equipment suspension means so that the equipment may fly off into space in a straight line tangent to the point of departure from the suspension means and be entirely free from effects of centrifugal force.

17. Apparatus for testing parachutes comprising a tower with a power driven shaft rotatably mounted thereon, flexible suspension means connected to said shaft and rotatable thereby, and a dummy carried by said suspension means and provided with elements for attaching a parachute pack thereto, said dummy being weighted at the front and formed with stabilizing means at the rear to maintain the dummy and parachute pack in predetermined positions relative to the suspension means when the shaft is rotated.

18. Apparatus for testing parachutes comprising a tower with a power driven shaft rotatably mounted thereon, suspension means connected to said shaft and rotatable thereby, a dummy carried by said suspension means and provided with elements for attaching a parachute pack thereto, a camera carried by the suspension means and focused on the space at the rear of the dummy, and means connected to the camera and to a pack carried by the dummy to successively actuate the camera and then release the parachute from the pack.

19. Apparatus for testing parachutes comprising a tower with a power driven shaft rotatably mounted thereon, suspension means connected to said shaft and rotatable thereby, a dummy carried by said suspension means and provided with elements for attaching a parachute pack thereto, a camera carried by the suspension means and focused on the space at the rear of the dummy, a line extending to the base of the tower and connected to a pack carried by the dummy and an elastic connection between said line and camera whereby a pull on said line will actuate the camera and thereafter release the parachute from the pack.

20. Apparatus for testing aviation equipment comprising a vertically extending shaft, equipment suspension means connected to said shaft and rotatable thereby in a generally circular path, and means for varying the effective length of said suspension means under the action of centrifugal force applied thereto, including a member engaged by the suspension means and movable to increase the effective length of the suspension means, and means opposing such movement of said member by the suspension means.

PREVOST F. SMITH.